(12) United States Patent
Wyciechowski et al.

(10) Patent No.: US 11,472,413 B2
(45) Date of Patent: Oct. 18, 2022

(54) MU CONFIDENCE ESTIMATION AND BLENDING

(71) Applicants: Steering Solutions IP Holding Corporation, Auburn Hills, MI (US); Continental Automotive Systems, Inc., Auburn Hills, MI (US)

(72) Inventors: Michael S. Wyciechowski, Grand Blanc, MI (US); Scott T. Sanford, Swartz Creek, MI (US); Mariam S. George, Lake Orion, MI (US); Tejas Varunjikar, Troy, MI (US)

(73) Assignees: Steering Solutions IP Holding Corporation, Auburn Hills, MI (US); Continental Automotive Systems, Inc., Auburn Hills, MI (US)

(*) Notice: Subject to any disclaimer, the term of this patent is extended or adjusted under 35 U.S.C. 154(b) by 88 days.

(21) Appl. No.: 16/774,431

(22) Filed: Jan. 28, 2020

(65) Prior Publication Data
US 2020/0262439 A1  Aug. 20, 2020

Related U.S. Application Data (60) Provisional application No. 62/807,845, filed on Feb. 20, 2019.

(51) Int. Cl.
*B60W 40/068* (2012.01)
*B60W 40/105* (2012.01)
*G05D 1/02* (2020.01)

(52) U.S. Cl.
CPC ........ *B60W 40/068* (2013.01); *B60W 40/105* (2013.01); *G05D 1/0219* (2013.01); *G05D 1/0223* (2013.01); *B60W 2520/04* (2013.01); *G05D 2201/0213* (2013.01)

(58) Field of Classification Search
CPC ............ B60W 40/068; B60W 40/105; B60W 2520/04; G05D 1/0219; G05D 1/0223; G05D 2201/0213
See application file for complete search history.

(56) References Cited

U.S. PATENT DOCUMENTS

| 8,983,706 B2 | 3/2015 | Hartmann et al. |
| 9,174,641 B2 | 11/2015 | Fritz et al. |
| 10,147,002 B2 | 12/2018 | Hartmann et al. |
| 2019/0047527 A1* | 2/2019 | Falconer ............... B60W 10/06 |
| 2019/0047575 A1* | 2/2019 | Lellmann ......... G08G 1/096741 |
| 2020/0079381 A1* | 3/2020 | Lombrozo ............. B62D 6/003 |

FOREIGN PATENT DOCUMENTS

| DE | 10107454 B4 | 12/2001 |
| DE | 102007007282 A1 | 9/2007 |
| DE | 102008047750 A1 | 5/2009 |

(Continued)

OTHER PUBLICATIONS

Machine translation of DE102014103843 (Year: 2015).*

(Continued)

*Primary Examiner* — Nicholas Kiswanto
*Assistant Examiner* — Mohamad O El Sayah
(74) *Attorney, Agent, or Firm* — Brooks Group, PLC (57) ABSTRACT

A number of illustrative variations may include a method of providing a reliable driving surface friction coefficient estimate.

5 Claims, 3 Drawing Sheets

(56) References Cited

FOREIGN PATENT DOCUMENTS

| DE | 102009041566 A1 | | 3/2011 | |
|---|---|---|---|---|
| DE | 10208815 B4 | | 5/2011 | |
| DE | 102012215526 A1 | | 12/2013 | |
| DE | 102014103843 A1 | * | 5/2015 | ............. B60T 8/172 |
| DE | 102015205673 A1 | | 10/2016 | |
| DE | 102016201937 A1 | | 8/2017 | |
| DE | 102016203545 A1 | | 9/2017 | |
| DE | 102016220692 A1 | * | 4/2018 | ............ B60T 8/1764 |
| EP | 2013069 B1 | | 1/2009 | |
| EP | 2681085 B1 | | 1/2014 | |
| EP | 2734425 B1 | | 5/2014 | |
| WO | 2014094767 A1 | | 6/2014 | |

OTHER PUBLICATIONS

Machine translation of DE-102016220692-A1 (Year: 2018).*
J.Borgeson, A Stalheim "Sensor Data Fusion for Road Friction Estimation, pp. 13-15" Chalmers University of Technology, Goteborg, Sweden, 2010.
C.S.Ahn "Robust Estimation of Road Friction Coefficient for Vehicle Active Safety Systems, Chapter 5" The University of Michigan, Ann Arbor, 2011.

* cited by examiner

MU CONFIDENCE ESTIMATION AND BLENDING

CROSS-REFERENCE TO RELATED APPLICATIONS

This application claims the benefit of U.S. Provisional Application Ser. No. 62/807,845 filed Feb. 20, 2019.

TECHNICAL FIELD

The field to which the disclosure generally relates to includes steering, braking, and propulsion systems.

BACKGROUND

Vehicles typically include steering systems.

SUMMARY OF ILLUSTRATIVE VARIATIONS

A number of illustrative variations may include a method of identifying and reacting to slippage between the tires of a vehicle and a driving surface.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

In a number of illustrative variations, an autonomous steering system may comprise a number of logic modules intended to autonomously address a number of areas of control within the realm of vehicle steering and travel including but not limited to vehicle acceleration, vehicle braking, and lateral control of the vehicle. The logic for the modules of the autonomous steering system may account for non-autonomous driver input.

In a number of illustrative variations, a vehicle may comprise a steering system. In such cases, the steering system may be manually operable by the driver via a steering interface, autonomously operable by as an autonomous steering system, or operable as a combination of autonomous and manual steering wherein the steering system is configured to receive and interpret steering input from a driver, the autonomous steering system, or both at the same time.

In a number of illustrative variations, a steering interface may comprise a handwheel, a joystick, a trackball, a slider, a throttle, a pushbutton, a toggle switch, a lever, a touchscreen, a mouse, or any other known means of user input.

In a number of illustrative variations, a vehicle may comprise a steering system comprising a steering interface and a steerable propulsion system such as but not limited to a steering wheel and road wheels, respectively. The steering system may be of the electric power steering type wherein physical linkages mechanically communicate a manipulation of the steering interface to the steerable propulsion system. The steering system may be of the steer-by-wire type wherein physical mechanisms do not mechanically communicate a manipulation of the steering interface to the steerable propulsion system and wherein a manipulation of the steering interface affects an associated manipulation of the steerable propulsion system via the communication of electronic devices such as but not limited to sensors, transceivers and electronically excited actuators.

In a number of illustrative variations, a vehicle having roadwheels may traverse any number of surfaces having any number of surface friction coefficients. While traversing these surfaces, it may be desirable for vehicle systems including but not limited to brake slip control systems, traction slip control systems, electronic brake force distribution systems, yaw torque control systems, and roll-over prevention systems to control the acceleration or braking of the roadwheels individually or in groups according to the estimated or sensed driving surface conditions including but not limited to estimated or sensed surface friction coefficients. In such cases, such vehicle systems may be acting to ensure improved safety or control of the vehicle beyond that which would be possible in a vehicle lacking such systems.

In a number of illustrative variations, a friction coefficient may be defined as the ratio of the frictional force between tow bodies in contact, parallel to the surface of contact, with which the bodies press against each other. A driving surface friction coefficient may be defined the friction coefficient at the point of or in the plane of where a vehicle's traversal means, such as but not limited to a tire or tread, presses against a driving surface.

In a number of illustrative variations, slip control systems such as but not limited to a traction control system (TCS) or engine stability control (ESC) may be used to prevent a vehicle's wheels from spinning, due to a low surface friction coefficient, when torque is delivered to the wheels. Slip control systems may therefore be used to promote vehicle stability by selectively delivering power to the wheels based upon sensed slippage of the wheels, thus preventing unintended imbalances in driving force delivered from each wheel to the vehicle.

In a number of illustrative variations, slip control systems such as but not limited to anti-lock braking systems (ABS) to prevent a vehicle's wheels from locking, due to a low surface friction coefficient, when braking. Electronic Braking Distribution (EBD) my also be used to adjust the bias between the rear brakes and front brakes or left brakes and right brakes. Slip control systems may therefore be used to promote maintained steering control by selectively braking the wheels based upon sensed slippage of the wheels, thus preventing unintended imbalance in braking force delivered from each wheel to the vehicle.

In a number of illustrative variations, a steering system may comprise an autonomous slip control system. In such illustrative variations, the slip control system may be integrated into or communicate with the vehicle control systems of the autonomous steering system including but not limited to the propulsion systems including but not limited to engine control systems, braking control systems, and vehicle steering systems.

In a number of illustrative variations, the surface friction coefficient, which may also be called the coefficient of surface friction, surface adhesion coefficient, or surface friction factor may be used as a metric for the amount of force that may be transmitted between a driving surface and a wheel of a vehicle.

In a number of illustrative variations, a sensor such as but not limited to an optical sensor may be used to determine whether a driving surface is reflective, and a determination of a diminished surface friction coefficient may be thus derived.

In a number of illustrative variations, a surface friction coefficient may be estimated by correlating data gathered from a temperature sensor, an ultrasonic sensor, and a camera. The data from all three devices may be correlated and compared against data that was collected using all three of such devices at a prior moment and stored in a lookup table as readings tied to a particular type of driving surface having an associated surface friction coefficient.

In a number of illustrative variations, a stereoscopic camera or a plurality of cameras may be used to create a depth map of a driving surface from which the roughness or smoothness of the road may be determined.

In a number of illustrative variations, a single camera is used to strategically collect an image or images and quickly yet efficiently process the image or images and classify the image or images based upon the features found therein. Features classified in the collected image or images may be classified in view of data collected at a prior moment wherein such features where associated with a particular surface friction coefficient. Thus, vehicle travel path and speed may be correlated to the collected and analyzed image or images along with relevant temporal aspects of vehicle travel to estimate a surface friction coefficient for the surface that the wheel of the vehicle is traversing at any given moment.

In a number of illustrative variations, the plausibility of an estimated surface friction coefficient may be obtained by correlating wheel speed data to a camera-based surface friction coefficient estimated via the use of a camera in a manner such as but not limited to the image classification method described above. A wheel-based surface friction coefficient may also be estimated from wheel speed data such as but not limited to wheel slip and wheel vibration. In such variations, a plausible coefficient of friction may be obtained by checking the camera-based surface friction coefficient against the wheel-based driving surface coefficient of friction. In some such variations, it may be determined that margining the camera-based surface friction coefficient and the wheel-based surface friction coefficient yields the most plausible and accurate estimate for a given driving surface's friction coefficient.

In a number of illustrative variations, estimates for driving surface friction coefficients may be calculated by the means described in any of the following publications: DE 102016203545 A1, DE 102016201937 A1, DE 102015205673 A1, U.S. Ser. No. 10/147,002 B2, DE 10107454 B4, EP 2734425 B1, U.S. Pat. No. 9,174,641 B2, U.S. Pat. No. 8,983,706 B2, EP 2681085 B1, DE 102009041566 A1, EP 2013069 B1, DE 10208815 B4, WO 2014094767 A1, DE 102012215526 A1, DE 102008047750 A1, DE 102007007282 A1. In some cases, where an estimated driving surface friction coefficient is utilized according to the methods disclosed herein, the estimated driving surface friction coefficient estimate may be calculated according to one or more of the methods described in the documents listed above.

In a number of illustrative variations, numerous estimated driving surface friction coefficients may be obtained according to any of the methods herein or any other known method. In such illustrative variations, it may be desirable to assign confidence levels to each of the numerous obtained estimated driving surface friction coefficients such that a best estimated driving surface friction coefficient may be determined and may be utilized by the vehicle systems with relatively high confidence. In such illustrative variations, the estimated driving surface with the high confidence level assigned to it may thus be utilized to calculate an estimated friction level that may thus be generated included in a control signal that may be sent to the steering system. Alternatively, any number of estimated friction levels may be calculated and confidence levels assigned thereafter. In this way, an estimated friction level having the highest confidence level may also be utilized to calculate an estimated friction level that may thus be included in a control signal that may then be communicated to some other vehicle system module for additional calculations or included in a signal that is communicated by the controller to the vehicle systems which may then account for the signal during operation.

In a number of illustrative variations, a conditional driving surface friction coefficient may be estimated only when a certain condition or conditions occur. As a non-limiting example, it may be detected that the vehicle is operating in a low, medium, or high surface friction condition by correlating the handwheel angle and one of handwheel torque and pinion torque to data regarding friction coefficients of the driving surface under in any number of low, medium, or high surface friction driving conditions. In such illustrative variations, upon sensing a handwheel torque, a handwheel angle, or a pinion torque of a certain magnitude or within a certain range of values, the controller may be used to assert a conditional update flag while updating the estimated conditional driving surface friction estimate. A conditional estimated friction level may thus be included in a control signal that may be sent to the steering system. The autonomous steering system may then account for the conditional estimated friction level when steering.

In a number of illustrative variations, if it is detected that the vehicle has exited the held turning maneuver, the controller may be used to desert the update flag. The controller may also be used to detect whether the vehicle is in a held turning maneuver in a manner such as but not limited to by monitoring the handwheel angle or torque, or pinion torque, and determining that they are being held at a relatively constant value, or by any other known method. If the controller detects that the vehicle is in such a held turning maneuver, the controller may be used to assert the conditional steady flag. If the controller detects that the vehicle has exited the held turn, the controller may be used to desert the conditional steady flag.

In a number of illustrative variations, while the conditional update flag is asserted, a conditional confidence level, associated with the estimated conditional surface friction level, may be incremented from a minimum value to a maximum value over a calibratable amount of time or a time that is natural result of the limitations of the vehicle systems which may include the controller.

In a number of illustrative variations, the controller may be used to monitor both the conditional steady state flag and the conditional update flag, if the controller detects that the conditional update flag is deserted while the conditional steady state flag is asserted, this may indicate that the vehicle systems have sensed that the vehicle is driving in a straight-forward manner, and as such the continuous driving surface friction coefficient may be the best estimated driving surface friction coefficient to use at that moment. Thus, the controller may be used to rapidly decrement the estimated conditional driving surface friction coefficient confidence level, thereby likely rapidly rendering the estimated continuous driving surface friction coefficient confidence level greater than the estimated conditional driving surface friction coefficient confidence level. If, in the course of monitoring both the conditional steady state flag and the conditional update flag, the controller detects that both the conditional update flag and the conditional steady state flag are deserted, the controller may be used to slowly decrement the estimated conditional driving surface friction coefficient confidence level, thereby slowly reducing the estimated conditional driving surface friction coefficient confidence level at a slow rate in order to keep the estimated conditional driving surface friction coefficient confidence level high while the vehicle is likely still turning, just not at a steady state. In such illustrative variations, the estimated conditional driving surface friction coefficient confidence level and the estimated conditional driving surface friction coefficient confidence level may thus be included in a control signal that may be may then be communicated to some other vehicle system module for additional calculations or included in a signal that is communicated by the controller to the vehicle systems which may then account for the signal during operation. The autonomous steering system may then account for the estimated conditional driving surface friction coefficient confidence level and the estimated conditional driving surface friction coefficient confidence level or a combination thereof.

In a number of illustrative variations, a continuous driving surface friction coefficient may be estimated continuously by correlating sensed rack forces to a plurality of modeled rack forces to generate a continuous estimated friction level which may be included in a control signal that is sent to the autonomous steering system. In such illustrative variations, while the sensed rack forces are compared to the plurality of modeled rack forces, as the sensed rack forces approach the magnitude of the plurality of model rack forces, the controller may be used to assert a continuous update flag while updating the estimated continuous driving surface friction estimate as well as an estimated continuous driving surface friction coefficient confidence level, the value of which may depend upon how near or far the sensed rack forces are to the nearest modeled rack force. The continuous estimated friction level may then be communicated to some other vehicle system module for additional calculations or included in a signal that is communicated by the controller to the vehicle systems which may then account for the signal during operation.

In a number of illustrative variations, a controller may be used to monitor a yaw rate, rack, position, rack velocity, and yaw rate of a vehicle. In such illustrative variations, the controller may be utilized to determine that the yaw rate, rack position, and rack velocity indicate that the vehicle is in a steady state or headed in a held-turn manner (constant yaw rate). In such an illustrative variation, the controller may be used to also monitor vehicle speed to determine that the vehicle is in a stable state. In some such cases, if the yaw rate is minimal or zero, the controller may be used to assert a steady flag.

In a number of illustrative variations, while the continuous update flag is asserted, a continuous confidence level, associated with the estimated continuous surface friction level, may be incremented from a minimum value to a maximum value over a calibratable amount of time or a time that is natural result of the limitations of the vehicle systems which may include the controller.

In a number of illustrative variations, the controller may be used to monitor both the continuous steady state flag and the continuous update flag, if the controller detects that the continuous update flag is deserted while the continuous steady state flag is asserted, this may indicate that the vehicle systems have sensed that the vehicle is driving in a straight-forward manner, and as such the continuous driving surface friction coefficient may change the most rapidly at that moment. Thus, the controller may be used to rapidly decrement the estimated continuous driving surface friction coefficient confidence level, except when the continuous update flag is reasserted, thereby reducing the estimated continuous driving surface friction coefficient confidence level immediately after it is updated when the vehicle is driving in a straight path. If, in the course of monitoring both the steady state flag and the update flag, the controller detects that both the continuous update flag and the continuous steady state flag are deserted, the controller may be used to slowly decrement the estimated continuous driving surface friction coefficient confidence level, thereby slowly reducing the estimated continuous driving surface friction coefficient confidence in order to keep the estimated continuous driving surface friction coefficient confidence level high while the vehicle is likely still turning. In such illustrative variations, the estimated continuous driving surface friction coefficient confidence level and the estimated continuous driving surface friction coefficient confidence level may thus be included in a control signal that may be may then be communicated to some other vehicle system module for additional calculations or included in a signal that is communicated by the controller to the vehicle systems which may then account for the signal during operation. The autonomous steering system may then account for the estimated conditional driving surface friction coefficient confidence level and the estimated continuous driving surface friction coefficient confidence level or a combination thereof.

In a number of illustrative variations, a controller may be used to monitor vehicle speed. In such illustrative variations, the controller may use the vehicle speed to determine whether to apply the estimated conditional driving surface friction coefficient, the estimated continuous driving surface friction coefficient, or a blend of the two when calculating an estimated friction level to be utilized by vehicle systems such as but not limited to TCS, ABS, etc. In such a case, the vehicle systems or the controller may have access to speeds or speed ranges that may be preordained as low, mid, or high. In some such illustrative variations where the vehicle speed is determined to be relatively low, the controller determine that the estimated conditional driving surface friction coefficient alone should be used in calculating the estimated friction level to be utilized by the vehicle systems. In some such illustrative variations where the vehicle speed is determined to be relatively high, the controller may be used determine that the estimated continuous driving surface friction coefficient alone should be used in calculating the estimated friction level to be utilized by the vehicle systems. In some such illustrative variations where the vehicle speed is determined to be in the mid range, an estimated conditional driving surface friction coefficient confidence level (denoted as $c_1$) may be associated with an estimated conditional driving surface friction coefficient (denoted as $\mu_1$) and an estimated continuous driving surface friction coefficient confidence level (denoted as $c_2$) may be associated an estimated continuous driving surface friction coefficient (denoted as $\mu_2$). Confidence levels $c_1$ and $c_2$ may be summed and the sum halved to yield an estimated final driving surface friction coefficient confidence level (denoted as $c_f$) as follows:

$$c_f = \frac{c_1 + c_2}{2}$$

which may be associated with a final driving surface friction coefficient (denoted as $\mu_f$) calculated as follows:

$$\mu_f = \frac{\mu_1 * c_1}{c_1 + c_2} + \frac{\mu_2 * c_2}{c_1 + c_2}$$

In such illustrative variations, the estimated conditional driving surface friction coefficient confidence level and the estimated continuous driving surface friction coefficient confidence level may thus be included in a control signal that may be sent to the steering system. The autonomous steering system may then account for the estimated conditional driving surface friction coefficient confidence level and the estimated continuous driving surface friction coefficient confidence level or a combination thereof.

In a number of illustrative variations, an estimated EBS driving surface friction that is largely obtained by utilization of a vehicle's braking and traction control systems (ABS, TCS, ESP, etc.) A controller may used to obtain these friction estimates according to methods described herein or by any known method. In some illustrative variations, a friction estimate is only updated while EBS is being utilized, and is decremented at a predetermined rate when EBS is no longer being utilized. This EBS friction estimate may also be assigned an associated EBS driving surface friction estimate confidence level. In some such cases, the EBS driving surface friction estimate confidence level may be increased by a predetermined rate, or sharply increased, while EBS is being utilized. Likewise, in some such cases, the EBS driving surface friction estimate confidence level may be decreased by a predetermined rate, or sharply decreased, while EBS is no longer being utilized. The EBS driving surface friction estimate and associated EBS driving surface friction estimate confidence level may then be communicated to some other vehicle system module for additional calculations or included in a signal that is communicated by the controller to the vehicle systems.

In a number of illustrative variations, any number of sensors and cameras may be used to sense or observe the road condition and a controller may be used to form an analysis of any amount of data or images collected by any sensors or cameras. The controller's analysis may result in classifying the road condition according to the methods disclosed herein or by any known method or methods. As a non-limiting example, a number may be associated with each possible classification of the road. For this example, a 0 may be associated with no detection, a 1 may be associated with dry asphalt or a high driving surface friction coefficient, a 2 may be associated with snow or a low driving surface friction coefficient, a 3 may be associated with ice or the lowest driving surface friction coefficient. In some such illustrative variations, a road condition driving surface friction coefficient may be determined from a set of modeled values, depending upon the road classification. As a non-limiting example, where the road classification is a 1, the road condition driving surface friction coefficient may be set to a value in the range of 0.35-0.75; where the road classification is a 2, the road condition driving surface friction coefficient may be set to a value in the range of 0.15-0.34; where the road classification is a 3, the road condition driving surface friction coefficient may be set to a value in the range of 0.12-0.14; where the road classification is a 0, the road condition driving surface friction coefficient may be set to a value in the range of 0.0-0.11. In some such illustrative variations, a road condition driving surface friction coefficient confidence level may also be determined and associated with the road condition driving surface friction coefficient. In some such illustrative variations, an associated road condition driving surface friction coefficient confidence level may be updated according to set values, depending upon whether a non-zero classification of the road is made, that is, where detection and classification is successfully performed. In some such illustrative variations, where road surface detection and classification is successfully performed, the associated road condition driving surface friction coefficient confidence level may be set to its maximum value, or spiked sharply toward that value. In some such illustrative variations where road surface detection and classification is not successfully performed, the associated road condition driving surface friction coefficient confidence level may be set to some other level below maximum or to zero, depending upon whether the vehicle's braking or traction control systems are active.

In a number of illustrative variations, the estimated EBS driving surface friction may be combined with the estimated road condition driving surface friction coefficient by a friction coordinator to yield a friction coordinator driving surface friction coefficient. As a non-limiting example, the estimated EBS driving surface friction may be combined with the estimated road condition driving surface friction coefficient by determining the respective confidence levels of both the estimated EBS driving surface friction coefficient or the estimated road condition driving surface friction coefficient. As a non-limiting example, in some cases if the estimated EBS driving surface friction coefficient confidence level is at its maximum value, then the friction coordinator driving surface friction coefficient may be set to a value composed of 10% of the value of the estimated EBS driving surface friction coefficient and 90% of the estimated road condition driving surface friction coefficient. As another non-limiting example, in some cases if the estimated EBS driving surface friction coefficient confidence level is at its minimum value, then the friction coordinator driving surface friction coefficient may be set to a value composed of 1% of the value of the estimated EBS driving surface friction coefficient and 99% of the estimated road condition driving surface friction coefficient. In some such cases, these respective contributions may be varied.

In a number of illustrative variations, an associated friction coordinator driving surface friction coefficient confidence level to be associated with the friction coordinator driving surface friction coefficient may be calculated by a simple equation:

$$\text{Friction Coordinator} = \frac{C + EBS + \text{Road Condition}}{3}$$

Where Friction Coordinator is the friction coordinator driving surface friction coefficient confidence level, C is an arbitrary constant value, EBS is the estimated EBS driving surface friction coefficient confidence level, and Road Condition is the estimated road condition driving surface friction coefficient confidence level. In some such illustrative variations, the result of this equation (friction coordinator driving surface friction coefficient) may then be run through a filter to set a limit for the minimum and maximum values of the estimated friction coordinator driving surface friction coefficient confidence level. In some such cases, an associated friction coordinator driving surface friction coefficient confidence level may be associated with the friction coordinator driving surface friction coefficient.

In a number of illustrative variations, the final driving surface friction coefficient may be combined with the friction coordinator driving surface friction coefficient as follows:

$$\mu_c = \frac{\mu_{lat} * c_1}{c_1 + c_2} + \frac{\mu_{long} * c_2}{c_1 + c_2}$$

where $\mu_c$ is a complete blended driving surface friction coefficient, plat is the final driving surface friction coefficient, $c_1$ is the final driving surface friction coefficient confidence level, $\rho_{long}$ is the friction coordinator driving surface friction coefficient, and $c_2$ is the friction coordinator driving surface friction coefficient confidence level.

In a number of illustrative variations, an associated complete blended driving surface coefficient confidence level to be associated with the complete blended driving surface coefficient may be calculated by a simple equation:

$$c_c = \max(c_1 + c_2)$$

where $c_c$ is a complete blended driving surface friction coefficient confidence level, $c_1$ is the final driving surface friction coefficient confidence level, and $c_2$ is the friction coordinator driving surface friction coefficient confidence level.

Figure 1:
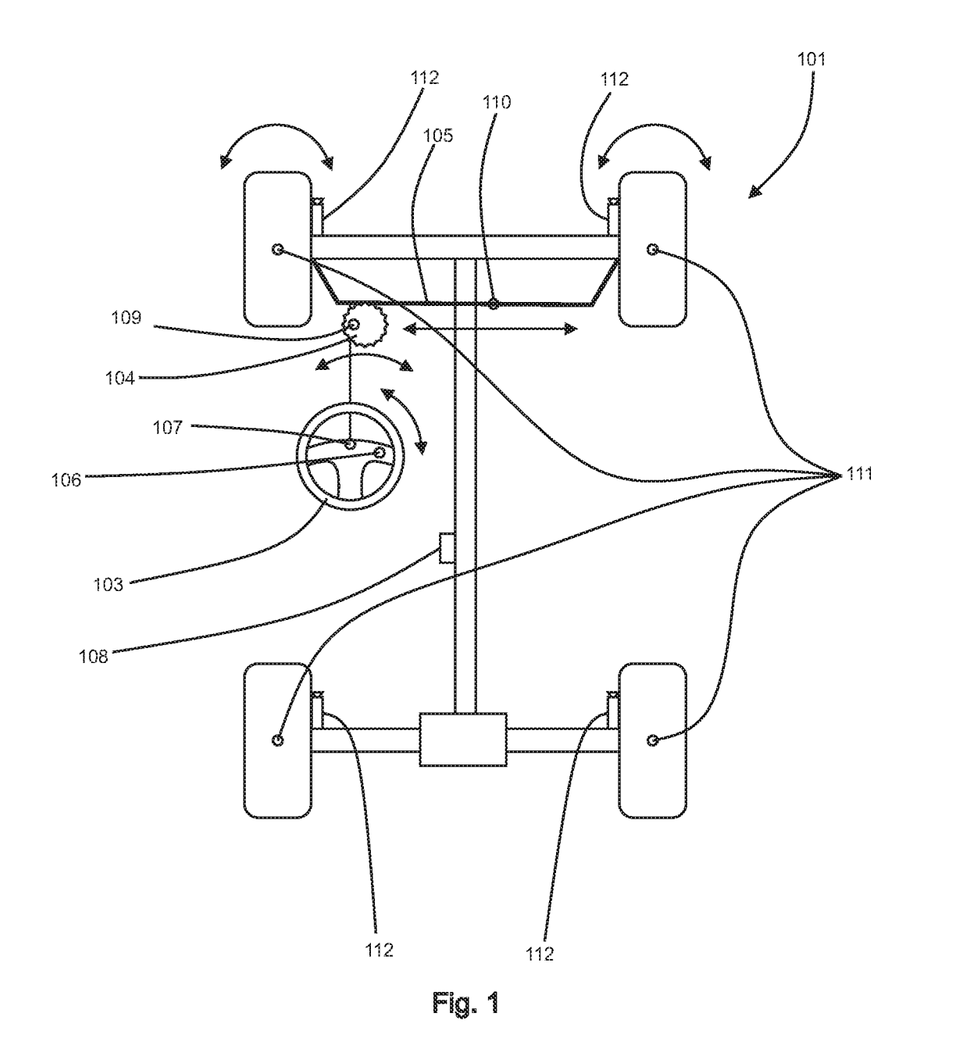
FIG. 1 depicts an illustrative variation of a vehicle equipped with hardware sufficient for carrying out at least some of the methods described herein.

Referring now to FIG. 1, an illustrative variation of a vehicle equipped with hardware that allows it to carry out at least some of the methods disclosed herein is shown. A vehicle 101 is equipped with wheels 102 and a handwheel 103 for turning the wheels 102 via a pinion 104 that engages a rack 105 that is constructed and arranged to turn the wheels 102. In the illustrative variation shown, the handwheel 103 is equipped with a hand wheel torque sensor 106 and a hand wheel angle sensor 107 so that any turning of the handwheel may produce sensor data that may be communicated to or accessed by a controller 108. Although, in this illustrative variation, the controller is shown onboard the vehicle, the controller may also be located somewhere apart from the vehicle and communicated with wirelessly by the sensors or the vehicle. The pinion 104 may be equipped with a pinion torque sensor 109 so that any turning of the pinion may be observed by or communicated to the controller and utilized by the methods described herein. In the illustrative variation shown, the rack 105 is equipped with a rack force sensor 110 so that any rack forces detected during driving may be observed by or communicated to the controller 108 and utilized by the methods described herein. Also shown in this illustrative variation, the wheels 102 may be equipped with road wheel sensors so that any road wheel data detected during driving may be observed by or communicated to the controller 108 and utilized by the methods described herein. Additionally, in the illustrative variation shown, cameras 112 are located near the wheels 102, though at least one of the cameras 112 may be located elsewhere in other illustrative variations. The cameras 112 may be used in conjunction with any sensor on the vehicle 101 that aids in monitoring vehicle travel or usage data at least for the purposes of the methods described herein.

Figure 2:
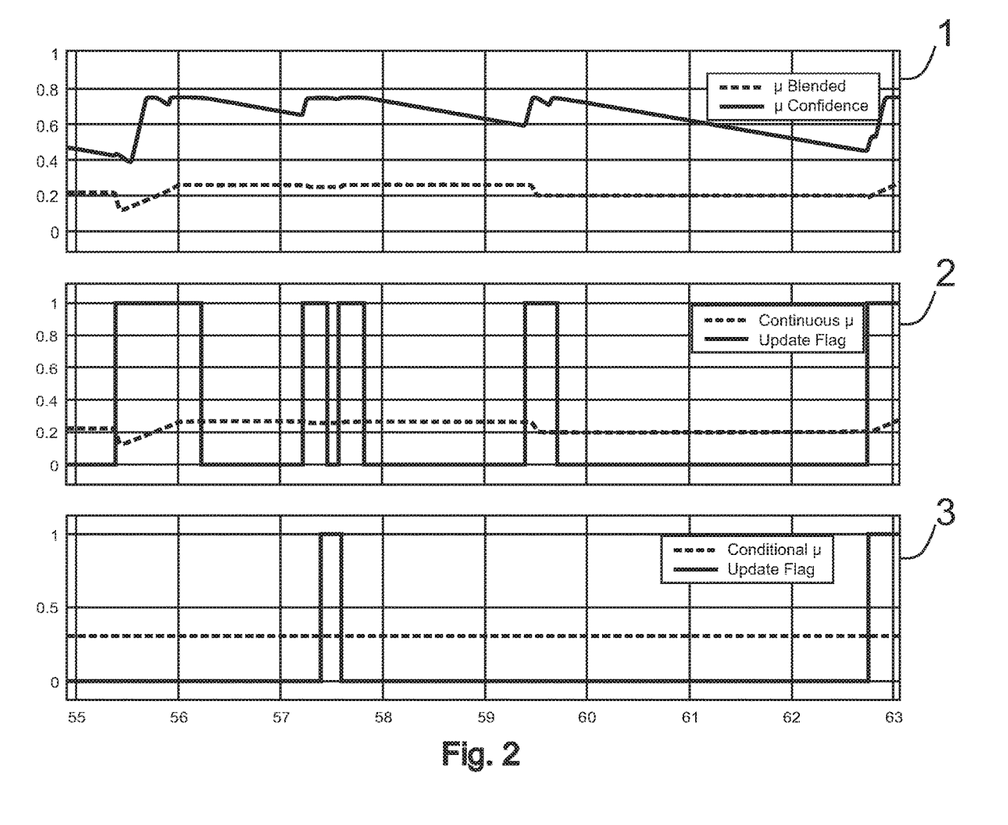
FIG. 2 depicts 3 sets of testing data from a vehicle utilizing an illustrative variation of an anti-slip technique disclosed herein wherein a first chart shows a blended estimated driving surface friction coefficient overlaid on an associated confidence level for that blended estimated driving surface friction coefficient over time, a second associated chart shows a continuous update flag state overlaid on an estimated continuous driving surface friction coefficient over time, and a third associated chart shows a conditional update flag state overlaid on an estimated conditional driving surface friction coefficient over time.

Referring now to FIG. 2, a set of charts formed from data collected during the operation of a vehicle that employed at least one of the methods described herein during operation. Chart 1 shows a blended estimated driving surface friction coefficient overlaid on an associated confidence level for the blended estimated driving surface friction coefficient. It can be seen in this illustrative variation that the confidence level does not necessarily vary with the blended estimated driving surface friction coefficient, although the two are sometimes related. Chart 2 shows a continuous estimated driving surface friction coefficient overlaid on a continuous update flag over time. It can be seen in this illustrative variation that a change in the update flag often affects a change in the continuous estimated driving surface friction coefficient. Chart 3 shows a conditional estimated driving surface friction coefficient overlaid on a conditional update flag over time. It can be seen in this illustrative variation that a change in the update flag does not often affect a change in the conditional estimated driving surface friction coefficient—this may be due to some other algorithmic bar or filter keeping the conditional estimated driving surface friction coefficient at a steady value.

Figure 3:
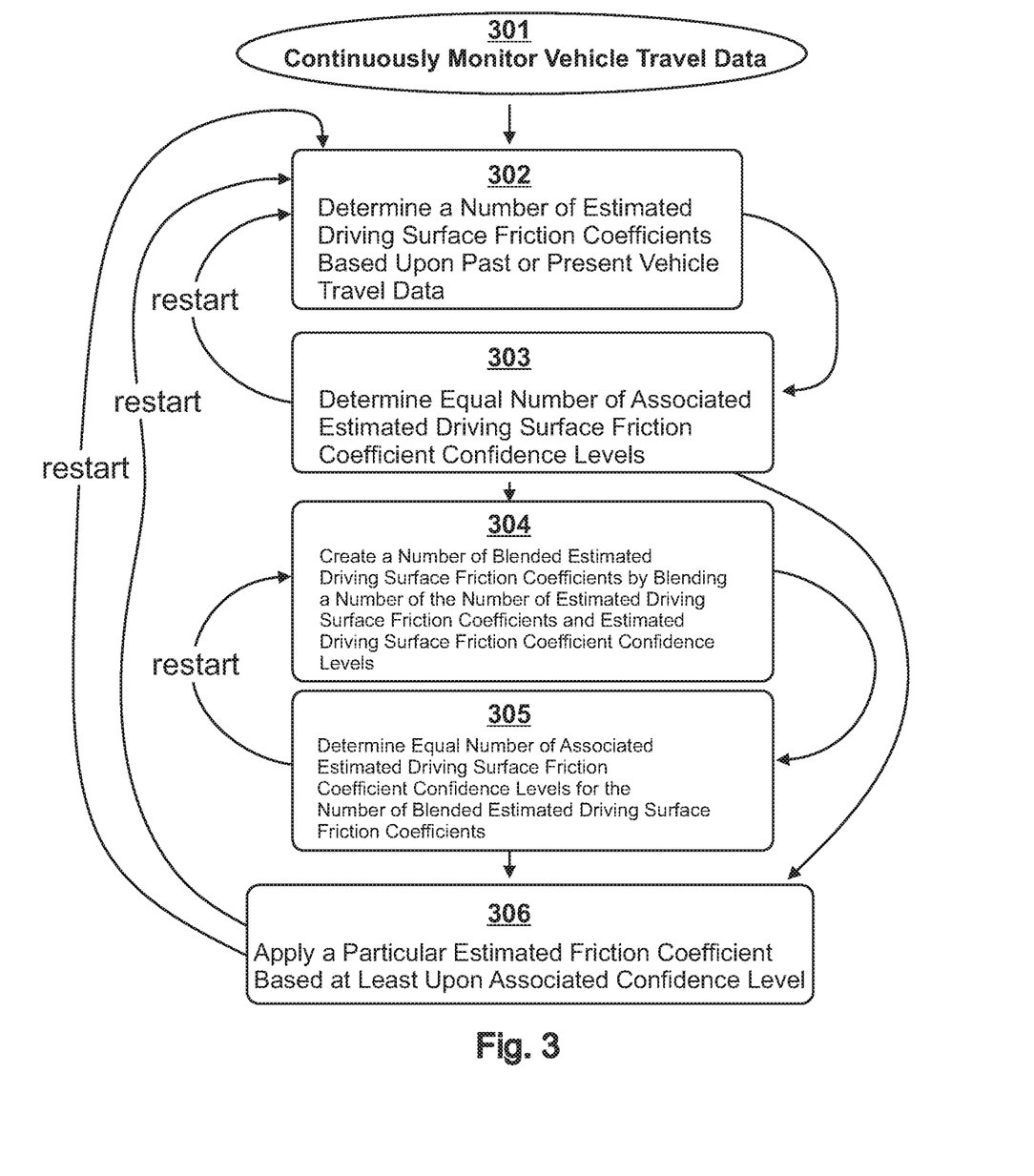
FIG. 3 depicts a flowchart of an illustrative variation of at least one of the methods of estimating and utilizing driving surface friction coefficient disclosed herein being performed iteratively.

Referring now to FIG. 3, a flowchart for an illustrative variation is depicted. Many of the steps in this illustrative variation may be performed cyclically. Vehicle travel data such as but not limited to engine torque, speed, or rate-of-change data, wheel speed, temperature, vibration or pressure data, vehicle speed, acceleration, yaw or pitch data, braking data such a temperature, vibration or pressure data, handwheel angle, position or torque data, pinion torque or angle data, rack force, vibration or position data, imaging data from optical devices such as but not limited to optical sensors or cameras, or any other data relevant to the aspects of travel for a vehicle may be continuously collected throughout all of the steps, starting at step 301. At step 302 driving surface friction coefficients are estimated based on the collected vehicle travel data. At step 303, a confidence level is determined and associated with each friction coefficient estimated in step 302. Step 302 may be transitioned to from 303 for recalculation at this point. At step 304 any number of estimated friction coefficients may be blended based on collected vehicle data or associated confidence levels to produce a number of blended estimated driving surface friction coefficients. At step 305, confidence levels are also determined and associated with the blended estimated driving surface friction coefficients, which may be referred to as blended estimated driving surface friction coefficients confidence levels. Steps 304 or 302 may be transitioned to from 305 for recalculation at this point. In step 306, one of the estimated driving surface friction coefficients or blended estimated driving surface friction coefficients may be applied to the vehicle systems based upon its associated confidence level or vehicle data. Step 302 may be transitioned to from 306 for recalculation at this point. Note also that in the illustrative variation shown, step 306 may be entered directly from step 303 as well.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may comprise a method comprising: providing a vehicle comprising a set of road wheels; providing a number of vehicle systems comprising a braking system configured to manipulate the brake set, a steering system configured to adjust a roadwheel direction, and a propulsion system configured to deliver driving power to the roadwheels; providing a number of sensors or cameras; providing a controller configured to process sensor and camera data; providing a driving surface having an actual coefficient of friction; using the sensors to determine a first estimated driving surface friction coefficient and a first associated confidence level; using the sensors to determine a second estimated driving surface friction coefficient and a second associated confidence level; using the controller to generate and communicate to the vehicle steering system an adjustment signal based upon any estimated driving surface friction coefficients and associated confidence levels; using the vehicle systems to manipulate the braking system, steering system, or propulsion system in an adjusted manner based upon the adjustment signal.

Variation 2 may comprise the method of variation 1 wherein using the controller to generate and communicate to the vehicle steering system an adjusted signal based upon any estimated driving surface friction coefficients and any associated confidence levels comprises using the controller to blend the first estimated driving surface friction coefficient with the second estimated driving surface friction coefficient and to blend the first associated confidence level with the second associated confidence level to create a first blended driving surface friction coefficient confidence level; and, incorporating the first blended driving surface friction coefficient and first blended driving surface friction coefficient confidence level into the adjustment signal.

Variation 3 may comprise the method of variation 1 further comprising using the sensors to determine a third estimated driving surface friction coefficient and a third associated confidence level; using the sensors to determine a fourth estimated driving surface friction coefficient and a fourth associated confidence level; using the controller to generate and communicate to the vehicle steering system an adjustment signal based upon the third estimated driving surface friction coefficient and third associated confidence level as well as the fourth estimated driving surface friction coefficient and fourth associated confidence level; using the vehicle systems to manipulate the braking system, steering system, or propulsion system in an adjusted manner based upon the adjustment signal.

Variation 4 may comprise the method of variation 3 wherein using the controller to generate and communicate to the vehicle steering system an adjusted signal based upon any estimated driving surface friction coefficients and any associated confidence levels comprises using the controller to blend the first estimated driving surface friction coefficient with the second estimated driving surface friction coefficient and to blend the first associated confidence level with the second associated confidence level to create a first blended driving surface friction coefficient; using the controller to blend the third estimated driving surface friction coefficient with the fourth estimated driving surface friction coefficient and to blend the third associated confidence level with the fourth associated confidence level to create a second blended driving surface friction coefficient confidence level; and, incorporating the second blended driving surface friction coefficient and second blended driving surface friction coefficient confidence level into the adjustment signal.

Variation 5 may include the method of variation 4 wherein incorporating the second blended driving surface friction coefficient and second blended driving surface friction coefficient confidence level into the adjustment signal comprises: blending the first blended driving surface friction coefficient with the second blended driving surface friction coefficient to create a total blended driving surface friction coefficient; blending the first blended driving surface friction coefficient confidence level with the second blended driving surface friction coefficient confidence level to create a total blending driving surface friction coefficient confidence level; and, incorporating the total blended driving surface friction coefficient and the total blended driving surface friction coefficient confidence level into the adjustment signal.

The above description of select variations within the scope of the invention is merely illustrative in nature and, thus, variations or variants thereof are not to be regarded as a departure from the spirit and scope of the invention.

What is claimed is:

1. A method comprising:
   providing a vehicle comprising a set of road wheels;
   providing a number of vehicle systems comprising a braking system configured to manipulate the brake set, a steering system configured to adjust a roadwheel direction, and a propulsion system configured to deliver driving power to the roadwheels;
   providing a number of sensors or cameras;
   providing a controller configured to process sensor and camera data;
   providing a driving surface having an actual coefficient of friction;
   using the sensors to determine a first estimated driving surface friction coefficient and a first associated confidence level, wherein the first estimated driving surface friction coefficient is a conditional driving surface friction coefficient, and the first associated confidence level is a conditional driving surface friction coefficient confidence level associated with the conditional driving surface friction coefficient;
   using the sensors to determine a second estimated driving surface friction coefficient and a second associated confidence level, wherein the second estimated driving surface friction coefficient is a continuous driving surface friction coefficient, and the second associated confidence level is a continuous driving surface friction coefficient confidence level associated with the continuous driving surface friction coefficient;

using the controller to generate and communicate to the vehicle steering system an adjustment signal based upon any estimated driving surface friction coefficients and associated confidence levels, wherein:

the adjustment signal is generated based on the first estimated driving surface friction coefficient and the first associated confidence level when the controller determines that the vehicle is at a first speed;

the adjustment signal is generated based on the second estimated driving surface friction coefficient and the second associated confidence level when the controller determines that the vehicle is at a second speed higher than the first speed by a margin;

the adjustment signal is generated based on a blend of the first estimated driving surface friction coefficient and the first associated confidence level with the second estimated driving surface friction coefficient and the second associated confidence level when the controller determines that the vehicle is at a third speed in the margin between the first and second speeds; and using the vehicle systems to manipulate the brake set, the steering system, or the propulsion system in an adjusted manner based upon the adjustment signal; and, the controller being constructed and arrange to determine if the vehicle is in a held turn maneuver, and if the controller determines that the vehicle is in a held turn maneuver, the controller asserts a conditional flag, and while the conditional flag is asserted, a conditional confidence level associated with an estimated conditional surface friction level is incremented from a minimum value to a maximum value over a calibrated amount of time.

2. The method of claim 1 wherein using the controller to generate and communicate to the vehicle steering system an adjusted signal based upon any estimated driving surface friction coefficients and any associated confidence levels comprises:

using the controller to blend the first estimated driving surface friction coefficient with the second estimated driving surface friction coefficient and to blend the first associated confidence level with the second associated confidence level to create a first blended driving surface friction coefficient confidence level; and, incorporating the first blended driving surface friction coefficient and first blended driving surface friction coefficient confidence level into the adjustment signal.

3. The method of claim 1 further comprising:

using the sensors to determine a third estimated driving surface friction coefficient and a third associated confidence level;

using the sensors to determine a fourth estimated driving surface friction coefficient and a fourth associated confidence level;

using the controller to generate and communicate to the vehicle steering system an adjustment signal based upon the third estimated driving surface friction coefficient and third associated confidence level as well as the fourth estimated driving surface friction coefficient and fourth associated confidence level; and, using the vehicle systems to manipulate the brake set, the steering system, or the propulsion system in an adjusted manner based upon the adjustment signal.

4. The method of claim 3 wherein using the controller to generate and communicate to the vehicle steering system an adjusted signal based upon any estimated driving surface friction coefficients and any associated confidence levels comprises:

using the controller to blend the first estimated driving surface friction coefficient with the second estimated driving surface friction coefficient and to blend the first associated confidence level with the second associated confidence level to create a first blended driving surface friction coefficient;

using the controller to blend the third estimated driving surface friction coefficient with the fourth estimated driving surface friction coefficient and to blend the third associated confidence level with the fourth associated confidence level to create a second blended driving surface friction coefficient confidence level; and, incorporating the second blended driving surface friction coefficient and second blended driving surface friction coefficient confidence level into the adjustment signal.

5. The method of claim 4 wherein incorporating the second blended driving surface friction coefficient and second blended driving surface friction coefficient confidence level into the adjustment signal comprises:

blending the first blended driving surface friction coefficient with the second blended driving surface friction coefficient to create a total blended driving surface friction coefficient;

blending the first blended driving surface friction coefficient confidence level with the second blended driving surface friction coefficient confidence level to create a total blending driving surface friction coefficient confidence level; and, incorporating the total blended driving surface friction coefficient and the total blended driving surface friction coefficient confidence level into the adjustment signal.

* * * * *